Sept. 2, 1930.  F. STROTHMANN  1,774,818
DIFFERENTIAL PUMP
Filed June 27, 1928
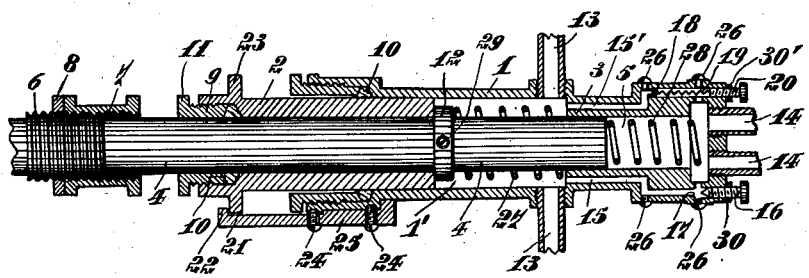
Inventor.
Friedrich Strothmann
per: [signature]
Attorney.

Patented Sept. 2, 1930

1,774,818

UNITED STATES PATENT OFFICE

FRIEDRICH STROTHMANN, OF ANTWERP, BELGIUM

DIFFERENTIAL PUMP

Application filed June 27, 1928, Serial No. 288,783, and in Belgium February 4, 1928.

The present invention is relative to a differential pump, more particularly intended to be used as a driving device for hydraulic or fluid brakes, principally in the case of motor vehicles or other vehicles.

In motor vehicles, the brakes act generally as well on the driving wheels as on the front or steering wheels. Now, it has been ascertained that, in order to avoid skidding, it is advantageous to apply the brakes and to realize a certain braking on the front wheels before the action of the rear wheel brakes takes place.

The differential pump according to the present invention has as an object to realize this action and to obtain thus, firstly, the application of the fore wheel brakes and a certain braking action on these wheels, then the application of the rear wheel brakes, and lastly, the driving movement being carried on, a perfect compensation in the action of the brakes acting upon the front and the rear wheels. For this purpose, the operating levers or rods of the brake act on a piston of a relatively small diameter, which brings about an increase in the pressure of the fluid existing in the cylinder corresponding to this piston and in the pipes leading from said cylinder to the front wheel brakes. During its shifting, this piston meets and causes to shift a second piston of relatively greater diameter, which causes an increase in the pressure of the fluid existing in the cylinder corresponding to the second piston and in the pipes leading from this piston to the rear wheel brakes. Connections of adjustable cross section and safety valves allow the compensation of the pressures and the cooperation of the actions on the different wheels to be realized. Another object of the invention is to realize an apparatus of the type set forth of easy and economical construction.

The invention will be hereafter described with reference to the figure of the accompanying drawing, which illustrates, merely by way of an example, an embodiment of the invention.

The figure is a longitudinal section through the apparatus.

With reference to this figure, the differential pump comprises a cylindrical body 1, forming the outer wall of a cylindrical cavity 1', in which a piston 2, having the same diameter as this cavity, is capable of shifting. At one end of the cylindrical body 1, a cylindrical body 3 of smaller diameter is inserted; this body 3 can also be cast in one piece with the body 1, by giving the latter a greater thickness at its required end. This cylindrical body 3 is also hollow and its inner cavity 5 allows the shifting of a movable piston 4 of substantially the same diameter as the cavity 5. On the other hand, this piston 4 fits in the piston 2, which is hollow and provided with a cavity having substantially the same diameter as piston 4. The piston 4 is provided, in a suitable place, with a threaded portion 6, on which is screwed a ring 7, the position of which can be adjusted along the threaded portion 6. A lock-nut 8 fixes the ring 7 in its required position.

The fluid-tightness of the apparatus is ensured by means of a stuffing box 9 for the piston 4, said stuffing box being screwed or otherwise mounted in the piston 2, and by means of a second stuffing box 10 for the piston 2, said stuffing box 10 being screwed or otherwise mounted in the body 1 of the apparatus. The stuffing box 9 is provided at its outer end with an annular rim 11 of greater diameter, forming abutment for the ring 7 screwed on the threaded portion 6.

The piston 4 comprises moreover a collar 12, which is mounted on it in an appropriate manner, say for instance by a pointed screw 29. Said collar 12 is arranged to abut against the inner end of piston 2 and thereby to limit the outward movement of piston 4.

The cavity 1' is connected by pipes 13 to the brakes of the rear wheels and the cavity 5 is connected by a pair of pipes 14 to the brakes of the front wheels.

In the walls of the body 1 have been contrived two channels 15 and 15', through which the fluid can pass from the cavity 5 to the cavity 1'. The quantity of fluid passing through channel 15 is controlled by a needle valve 16, said needle valve being capable of completely stopping the channel 15 when it is fitted on its seat 17. On the other hand, a ball 18, on which acts a spring 19, is fitted in channel 15', said ball being constantly pressed against its seat and allowing the passing of the fluid in one direction only, i. e. from the cavity 1' to the cavity 5, and this only when the pressure is sufficient to overcome the action of spring 19. The strength of spring 19 can be adjusted by a screw 20. Lock-nuts 30 and 30' are provided to fix screws 16 and 20 in their required position.

The outward stroke of piston 2 is limited by a shank or rod 21 provided at one end with an inwardly projecting lug 22 and fastened at the other end by means of screws 24 to the body 1 of the apparatus. The lug 22 serves as abutment for a collar 23 forming part of the piston 2. The rod 21 comprises a shouldered portion 25 which is intended to avoid a shear of the screws 24. Screws 26 allow the drilling of the channels in the body of the apparatus which are facing them. Springs 27 and 28 are provided inside the body to bring respectively the piston 2 through the medium of the collar 12 and the piston 4 back to their inoperative or release position.

The working of the device which has just been described is easy to understand. When a force is exerted on the movable or automatic driving mechanism of the brakes, the rod of piston 4 is shifted from the left to the right and piston 4 advances in cavity 5 in opposition to the action of a return spring 28. This shifting causes the brakes to be applied on the front wheels and a certain braking action on the latter. At the same time, however, a certain quantity of fluid under pressure in cavity 5 tends to flow through channel 15 towards cavity 1'. When the piston 4 has effected a stroke $a$ equal to the length comprised between ring 7 and abutment 11, said ring 7 will meet this abutment 11 forming part of piston 2 and thereby cause the latter to move also from the left to the right. The shifting of piston 2 causes the brakes to be applied on the rear wheels and a certain braking action to be exerted on the latter, but during this time the braking action on the front wheels has increased, since piston 4 has advanced further in cavity 5.

If the device works with a perfect compensation, that is to say if the relations of the braking actions on all the wheels are exactly those which have been predetermined, the pressures in cavities 1' and 5 are equal and no flowing of fluid takes place through channel 15. If, on the other hand, the braking action on the front wheels is too great, the pressure in cylinder 5 is greater than that in cavity 1' and an exchange of fluid takes place between these two cavities through channel 15, and thereby the pressure in both cavities is brought back to its normal value. If on the contrary the pressure is too great in cylinder 1', an exchange of fluid will take place through channel 15 and also through channel 15', if the pressure is great enough to overcome the resistance of the spring acted ball 18. In this way, the compensation can take place instantaneously and a great braking action on the rear wheels previous to a sufficient braking action on the front wheels is avoided.

The new driving device for hydraulic or fluid brakes is characterized by its simplicity and the strength and resistance of its construction, there being no links and connecting rods; as well as by the efficiency of its working. Moreover, it ensures constantly and in a perfectly automatic way the adjustment of the brakes on the different wheels. Besides, with the present device, not only brakes acting on wheels, but also brakes acting on the differential or on other elements of the transmission can be driven and controlled.

It must be understood that the embodiment illustrated is merely given by way of an example, and that various modifications can be brought to it without departing from the scope of the invention.

I claim:

1. A differential pump of the type set forth, comprising a body, a cavity of extended length inside said body, a second cavity of relatively smaller cross sectional area extending over the remaining part of the length inside said body, the axes of the two cavities being on the same straight line, pipes connecting the two cavities to each other, pipes connecting the first cavity to a number of brakes, pipes connecting the second cavity to the remaining brakes, a piston adapted to slidably fit in the cavity of smaller cross sectional area and passing through and out of the cavity of greater cross sectional area, a hollow piston adapted to slidably fit in the cavity of larger cross sectional area and to surround the first mentioned piston without hindering the movements of the latter, a stuffing box for the hollow piston mounted in the body, a stuffing box for the first mentioned piston mounted in the hollow piston, an abutment adjustably mounted on the first piston, adapted to move integrally with said piston and to abut against the stuffing box of said piston when this piston has shifted for a part of its stroke equal to the distance between said abutment and said stuffing box, springs arranged to bring both pistons back to their inoperative position, and means to limit the return movements of the pistons.

2. In a differential pump of the type set forth, a body, a piston moving inside said body, a hollow piston adapted to slidably fit in said body and to surround the first piston without hindering the movements of the same, springs arranged inside said body to bring the pistons back to their inoperative position when the action on their driving mechanism is relieved, a collar mounted on the first piston and arranged to engage the inner end of the hollow piston and thereby to limit the outward movements of the first piston, a collar forming part of the hollow piston, a rod mounted outside the body, an inwardly projecting lug forming part of said rod and arranged to engage the collar of the hollow piston and thereby to limit the outward movement of the same.

3. In a differential pump of the type set forth, a body, a cavity of extended length inside said body, a cavity of smaller cross sectional area extending over the remaining part of the length inside said body, the axes of the two cavities being on the same straight line, pipes connecting the first cavity to a group of brakes, pipes connecting the second cavity to another group of brakes, two channels arranged in the wall of said body, and connecting the two cavities to each other, an adjustable needle valve in one of said channels controlling the quantity of fluid passing through the same, a spring acted ball in the other channel, a seat for said ball and means to adjust the strength of the spring acting on the ball the arrangement being such that the fluid can only flow in one direction in said last-mentioned channel when its pressure is sufficient to overcome the action of the spring.

In testimony whereof I signed hereunto my name.

FRIEDRICH STROTHMANN.